United States Patent [19]

McCowan

[11] Patent Number: 4,991,066
[45] Date of Patent: Feb. 5, 1991

[54] SKATEBOARD LIGHTING ADAPTOR KIT

[76] Inventor: Gregory L. McCowan, 2808 Monticello Ave., Oakland, Calif. 94619

[21] Appl. No.: 429,040

[22] Filed: Oct. 30, 1989

[51] Int. Cl.$^5$ ............................................. B60Q 1/00
[52] U.S. Cl. ...................................... 362/61; 362/276; 280/87.042; 446/219; 446/438
[58] Field of Search ................ 362/61, 103, 253, 276, 362/802; 280/87.042, 11.18; 446/485, 438, 219

[56] References Cited

U.S. PATENT DOCUMENTS

| | | | |
|---|---|---|---|
| 2,505,154 | 4/1950 | Smith | 362/103 |
| 2,931,012 | 3/1960 | Kosach . | |
| 4,336,573 | 6/1982 | Carter | 362/78 |
| 4,367,515 | 1/1983 | Beard | 362/103 |
| 4,463,412 | 7/1984 | Broach | 362/103 |

Primary Examiner—Ira S. Lazarus
Assistant Examiner—Richard R. Cole
Attorney, Agent, or Firm—Bielen, Peterson & Lampe

[57] ABSTRACT

A skateboard lighting adaptor kit that is mountable to a conventional skateboard having a deck with front and rear wheel assemblies, the lighting kit including head lights mountable to the underside of the deck proximate the front wheel assembly, tail lights mountable to the underside of the deck proximate the rear wheel assembly, and side running lights mountable to the sides of the deck, the kit including electronic control means to allow the side running lights to be slectively lighted to signal a turn.

9 Claims, 1 Drawing Sheet

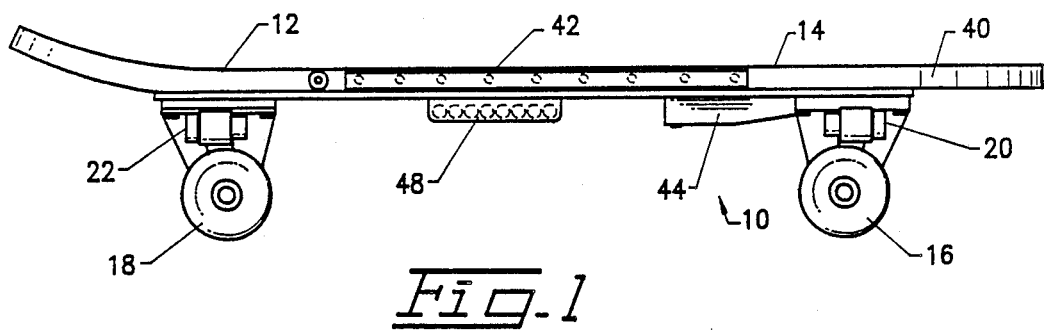
Fig-1
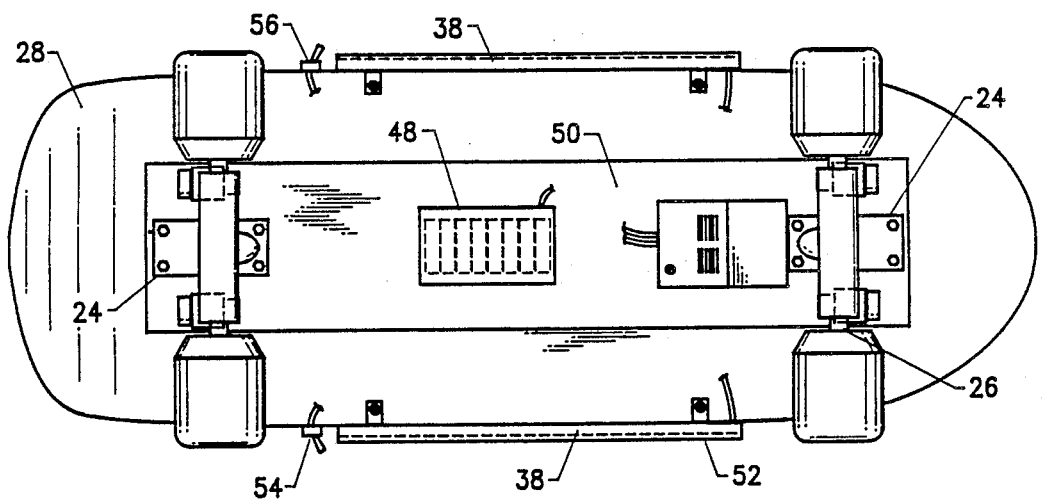
Fig-2
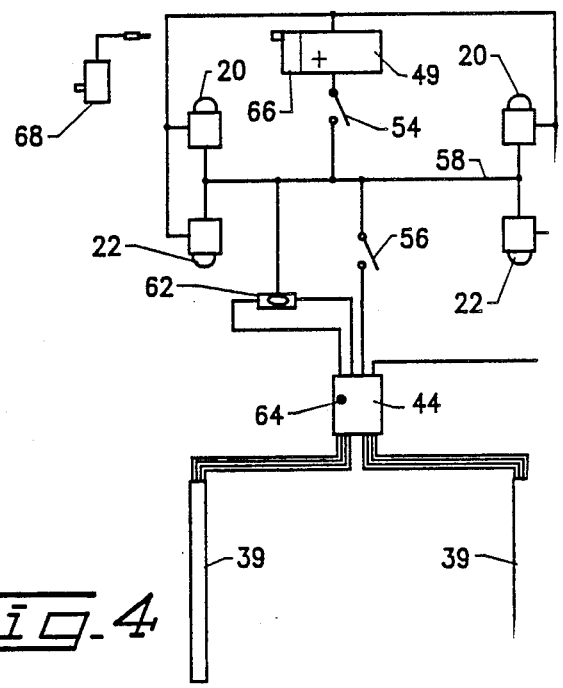
Fig-3
Fig-4

SKATEBOARD LIGHTING ADAPTOR KIT

BACKGROUND OF THE INVENTION

This invention relates to a skateboard lighting adaptor kit for use on a conventional skateboard to allow safe, night time use or for simply ornamental or decorative purposes. Skateboarding has become a sport that has become extremely popular over the past ten years. Frequently, the boards are decorated with bright colors and patterns and are often customized in appearance to the user's tastes. The lighting adaptor kit of this invention provides a further embellishment for the skateboard and can be mounted on the board in such an inobtrusive manner that it does not affect the performance of the board in any material respect.

Frequently, the skateboard rider desires to ride his board at dusk and during the night. However, at such times it is very dangerous since motorists and/or pedestrians have a difficult time seeing the skateboard rider which could result in collision and injury. Furthermore, even when the rider is performing in a restricted and safe area, it is desirable to add some means that will enable the stunts and action of the board to be perceived by onlookers. While certain reflectors have been utilized on skateboards to reflect external lighting, a full system of running lights has not heretofore been included on a skate board. The running lights that are utilized in this skateboard lighting adaptor kit are included for both safety and ornamental reasons. The running light system is self-contained and includes various means for automatically and manually operating the lights in a pattern that provides visual assistance to the rider and a directional signal to motorists and others. The adaptor kit is designed to be easily mounted to the skateboard with conventional tools.

The adaptor kit of this invention is designed to be a great show piece for all skateboards and to improve both the enjoyment and safety of the sport.

SUMMARY OF THE INVENTION

This invention relates to a lighting kit that is adapted to be installed on a conventional skate board. The lighting kit is a safety feature that enables a skate board rider to ride his board at night with running lights to warn motorists of the presence of the rider. The particular preferred lighting system that comprises the skateboard adaptor kit is designed to be an active system that includes small headlamps that light the immediate area in front of the skateboard and tail lamps that are red in color to indicate the rear of the skateboard. On the sides of the skateboard are a series of attractive, timed, serial functioning lights to indicate the side of the skateboard. As a preferred feature, the skateboard includes a mercury switch to allow one set of the running side lights which are arranged in a strip to be lit while the other comparable side light strip is darkened during the execution of a turn. In such a manner the skateboard adaptor kit provides an automatic turn signal.

To provide for powering the lights of the skateboard adaptor kit, the kit includes an underplate that has a battery pack and an electronic control panel mounted thereon. The lighting kit is adapted to be easily secured to the skateboard using the fasteners that secure the wheel mounts to the underside of the board. The battery pack can be supplied with a recharger for insuring that the batteries are maintained in a charged condition when the skateboard is not in use. To conserve energy, the power pack can be equipped with a switch that is mounted on the top side of the skateboard and accessible by the foot of the rider. These and other features of the invention will become apparent during consideration of the detailed description of the preferred embodiments.

BRIEF DESCRIPTION OF THE DRAWINGS

FIG. 1 is a side elevational view of a conventional skateboard with the lighting kit mounted thereto.

FIG. 2 is a bottom plan view of the skateboard of FIG. 1.

FIG. 3 is a rear elevational view of the skateboard of FIG. 1.

FIG. 4 is a simple electronics schematic showing the basics of a running light system with turning signals.

DETAILED DESCRIPTION OF THE PREFERRED EMBODIMENTS

Referring now to FIG. 1, the skateboard adaptor kit, identified generally by the reference numeral 10, is shown connected to a conventional skateboard 12. The skateboard has a deck 14 with a front wheel assembly 16 and a rear assembly 18. The lighting kit comprises a pair of front headlights 20 and a pair of tail lights 22. The head lights 20 and tail lights 22 are mounted on each side of a mounting block 24 which connects the wheel assemblies 16 and 18 to the underside of the skateboard deck 14, as shown in FIG. 2. By mounting the headlights 20 and tail lights 22 proximate the wheel assembly blocks 24 and between the wheel shafts 26 on the underside 28 of the deck 14, the lights are well protected from injury and damage during operation of the skateboard. The head lights 20 and tail lights 22 are similarly constructed with a mounting bracket 30 and a housing 32 connected to the mounting bracket and a gimbal mounted lens assembly 34. The gimbal mounted assembly 34 enables the lights to be adjusted in position to direct the light in the manner desired by the operator. The tail lights 22 differ from the head lights 20 in the color of the lens 36, which is red in color to signal the rear of the skateboard. The head lights have sufficient directional focus to provide lighting of the immediate area in front of the board to illuminate obstacles.

In addition to the head lights 20 and tail lights 22 are elongated side lights 38 mounted to the side edge of the deck 14 as shown in FIGS. 1-3. The side lights 38 comprise a lighting strip with a series of light emitting diodes 42 which can be individually lighted in a timed sequence or alternately lighted together as a set.

Control of the lighting system is accomplished by an electronic controller pack 44 which includes electronic circuitry of the type shown in FIG. 4 for operating the lighting system according to the desire of the rider. A lighting system may be simply turned on or off with all lights operating in a conventional manner or preferably operated with a mercury switch that senses the roll of the board along its longitudinal axis. In riding a skateboard when it is desired to turn, pressure is applied to one side of the board to cause it to be downwardly displaced relative to the opposite side. This causes the wheel housing to adjust and the board will traverse in an arc of a circle. This roll displacement can be sensed by the mercury switch and the lights on one side of the board can automatically be caused to blink, while the lights on the other side of the board are extinguished.

Power for the controller pack 44 is provided by a battery pack 48 which is mounted on the underside of the board adjacent the controller pack. The underside components are all mounted to an elongated plate 50 which is flexible to conform to any curvature in the skateboard deck 14. In this manner, the ease of assembly is enhanced with only the side lighting strips 38 requiring separate mounting. The side lighting strips 42 are encased in a protective nylon sleeve 52 such that they can withstand the normal scraping encountered during vigorous use of the skateboard. Generally, the side running lights 38 can utilize the same screw holes used for protective side rails which the running lights replace. Otherwise, special screw holes need to be drilled into the side of the deck to allow fastening of the side running lights. Also mounted on the side edge of the deck 14 are control switches 54 and 56 for operating the running lights.

Referring to FIG. 4, a general schematic illustration of the electronic circuit is provided. The circuit may be altered to enable new and different operational sequences to be accomplished by the system. In the schematic illustration of FIG. 5, the battery pack 48 connects to the lights through a power switch 54 that turns the running lights off and on as a unit. The power switch 54 provides the active power line 58 that directly connects to the head lights 20 and tail lights 22 which are provided with a ground return line 60 that connects to the battery pack 48. The power line 58 also connects to a toggle switch 56 which when activated connects the power line 58 with the controller 44 for operating the sequential side running lights 38. When activated, the switch 56 powers both of the running lights for simultaneous operation. Alternately, when the switch 56 is open, the power line 58 connects to a three way mercury switch 62 that is located on the underside of the deck in such a manner as to activate both side running lights 38 when the mercury switch is level and selectively activate one or the other of the side lights 38 when the board is tilted. The control module 44 and running lights 38 used, are a modified Model No. 750 Night Rider light from Rally Accessories, Inc. The control module 44 includes a timing control 64 to control the timing of the sequentially flashing lights 38. The Rally Night Rider light is constructed with a series of light emitting diodes 42 in the strip which are sequentially lit under control of the controller 44. The switch arrangement enables the side lights 38 to be used either as an ornamental flashing light or as a turn signal. As shown in FIGS. 1 and 2, the switches 54 and 56 are easily accessible toggle switches which can be manipulated by the rider's foot. In the preferred embodiment, the battery pack 48 includes a conventional charge pack 66 which can be used with an AC adaptor 68 to recharge the batteries that are contained in the battery pack 48.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A skateboard lighting kit adapted for use on a conventional skateboard having a deck with sides and with an underside having front and rear wheel assemblies mounted thereto comprising:

a power pack mountable to the underside of the skateboard deck, at least one side light on each side of the skateboard deck, electronic connection means electronically connecting the power pack with the side lights for selectively lighting said side lights on activation, wherein the electronic connection means includes at least one level sensing switch lighting one or the other or both of the side lights depending on the orientation of the skateboard deck, the side lights signaling a turn by extinguishing one of the side lights while lighting the other.

2. The skateboard lighting kit of claim 1 wherein the electronic connection means includes an override switch for lighting both of the side running lights when the switch is activated.

3. The skateboard lighting kit of claim 2 wherein the power switch and override switch are mounted on the side of the skateboard deck for access by a user's foot.

4. The skateboard lighting kit of claim 3 wherein the power pack includes a detachable A.C. recharge adaptor.

5. The skateboard lighting kit of claim 1 wherein the electronic connection means includes a power switch for activating the side lights.

6. The skateboard lighting kit of claim 1 wherein each of the side lights comprises an elongated running light.

7. The skateboard lighting kit of claim 6 wherein the skateboard deck has side edges and the elongated running lights are mountable to the side edges of the skateboard deck.

8. The skateboard lighting kit of claim 6 wherein said electronic connection means includes a controller wherein the side lights each have a plurality of individual lights that are sequentially lit under operation of said controller.

9. The skateboard lighting kit of claim 1 having further at least one front light having mounting brackets mountable to the underside of the skateboard deck proximate the front wheel assembly and, at least one rear light having mounting brackets mountable to the underside of the skateboard deck proximate the rear wheel assembly, the front and rear lights being connected to the power pack by the electronic connection means, the electronic connection means having a power switch means for turning on and off the front and rear lights and activating the side lights.

* * * * *